United States Patent [19]

Taylor

[11] Patent Number: 4,744,643
[45] Date of Patent: May 17, 1988

[54] APPARATUS FOR RESTRICTING MOTION OF LIVING MICROSCOPIC ORGANISMS DURING OBSERVATION UNDER A MICROSCOPE

[76] Inventor: Howard L. Taylor, 2221 NE. 123 St., North Miami, Fla. 33181

[21] Appl. No.: 5,126

[22] Filed: Jan. 20, 1987

[51] Int. Cl.⁴ ............................................. G02B 21/34
[52] U.S. Cl. ..................................... 350/536; 356/244
[58] Field of Search ............... 350/534, 535, 536, 529, 350/530, 531, 507

[56] References Cited

FOREIGN PATENT DOCUMENTS 920  9/1877  Fed. Rep. of Germany ...... 350/534

*Primary Examiner*—Jon W. Henry
*Attorney, Agent, or Firm*—John Cyril Malloy

[57] ABSTRACT

A device for restricting the movement of a living, microscopical organism being viewed with the aid of a microscope including a base mounting a first glass element upon which an organism is placed and a second glass element parallel to and over said first glass element and mounted on an arm extending from a hub on a columnar adjusting mechanism. The adjusting mechanism includes a column mounted on said base normal to the plane of said first glass element. A compression spring is mounted concentrically on said column and supports said hub which is movable vertically and rotably on said column. The hub is movable up and down the column by adjusting a knurled screw which is threaded into the column and bears on the hub through an isolation element which prevents the transfer of rotational force in either direction between the knob and the hub.

1 Claim, 1 Drawing Sheet

4,744,643

APPARATUS FOR RESTRICTING MOTION OF LIVING MICROSCOPIC ORGANISMS DURING OBSERVATION UNDER A MICROSCOPE

BACKGROUND OF THE INVENTION

Invention relates to the field of microscopy and more specifically to microcompressors which serve to restrict the motion of living, microscopic organisms under observation as viewed with the aid of a microscope.

Known art includes, in its simplest form, an apparatus similar to a pill box and having glass elements, as its top and bottom that are mounted in metal frames provided with mating threads. An organism to be observed was placed in a drop of liquid on the lower glass element, the top half metal frame was than threaded onto the lower half until the liquid was in contact with both glass elements and, by continuing to turn the top half frame with respect to the bottom half frame, the opposing inner glass surfaces were brought together so as to lightly restrain the living organism. The disadvantage of this apparatus lay in the difficulty of adjustment and the tendency for unwanted lateral displacement of the organism.

Another example of prior art is in apparatus which comprises a metal base, a glass element mounted in said base, a second metal element hinged at one end of the base and extending over the length of the base, a second glass element mounted in the hinged, second metal element over the glass element mounted in the base, and an adjusting screw whereby the distance between the opposing inner glass surfaces can be varied. An organism to be observed is placed in a drop of liquid on the lower glass element, the hinged metal element is lowered into position and the adjusting screw is turned until the liquid is in contact with both glass elements, and, by continuing to turn the adjusting screw, the opposing glass surfaces are brought together so as to lightly restrain the living organism. The disadvantage of this apparatus lies in the fact that the inner, opposing surfaces of the glass elements can be made parallel in only one setting of the adjustment, while the size of organisms to be observed varies considerably. As a result of this, the apparatus is characterized by unwanted lateral displacement.

Another example of prior art is an apparatus which comprises a metal base, a glass element mounted in said base, a second glass element over the first element mounted in a metal arm extending from a hub on a fixed column located near one end of the metal base. The hub is movable on said fixed column so as to permit rotation of the hub whereby the second glass element can be displaced laterally with reference to the first and displaced perpendicularly whereby the separation between the opposing, inner glass surfaces can be varied. The hub is supported by a helical compression spring and adjustment effected by means of an adjusting screw which bears against the hub. The disadvantage of this apparatus lies in the fact that there is no isolation between the rotary motions of the adjusting screw and the hub. Hence rotation of the adjusting screw imparts rotation to the hub and causes unwanted lateral displacement of the organism for all except one position in which such movement is prevent by a hub-mounted detent which seats in a vertical groove in the column.

Although unwanted displacement is highly objectionable, it is very useful, during observation of an organism, to be able to induce controlled displacement whereby the microscopic object being observed can be rolled over for the purpose of obtaining a view from a different aspect. The disadvantage of this apparatus lies in the fact that the detent is usually out of its related groove and adjustment usually is accompanied by unwanted displacement.

A further disadvantage with this apparatus lies in the fact that the area of the glass element mounted in the adjustable arm is so small, and the location of the adjusting mechanism is so near to it that it is impossible to change from one microscope objective to another without interfering with the adjustable arm or the adjusting mechanism of microscopes equipped with revolving objective changers. A further disadvantage with this apparatus lies in the fact that the dimension from the bottom of the metal, base plate to the upper surface of the glass element, mounted in it, exceeds the focal length of many modern substage condensers. This condition results in degradation of the image.

OBJECTS OF THE INVENTION

It is an object of the invention to provide a microcompressor with specimen restraining means isolated from the rotational component of the adjustment means.

It is a further object of the invention to provide a microcompressor with adjustment means located so as not to interfere with the interchange of microscope objectives mounted on a revolving nosepiece.

It is a further object of the invention to provide a microcompressor with effective slide thickness compatible with modern, microscope, substage illumination condensers.

It is a further object of the invention to provide a microcompressor with positive reference means for area of scanning and for interchange of microscope objectives mounted on a revolving nosepiece without interference with the arm on which the adjustable restraining means is mounted.

BRIEF DESCRIPTION OF THE INVENTION

The invention overcomes the aforementioned limitations of prior art and achieves the aforementioned objects and other objects and advantages of the invention may be found in the following detailed description when taken in conjunction with the figures in which:

FIG. 1 shows the plan view of the microcompressor in accordance with the principles of the present invention; and, FIG. 2 shows a front and partial sectional view of the microcompressor.

DETAILED DESCRIPTION

Figure 1:
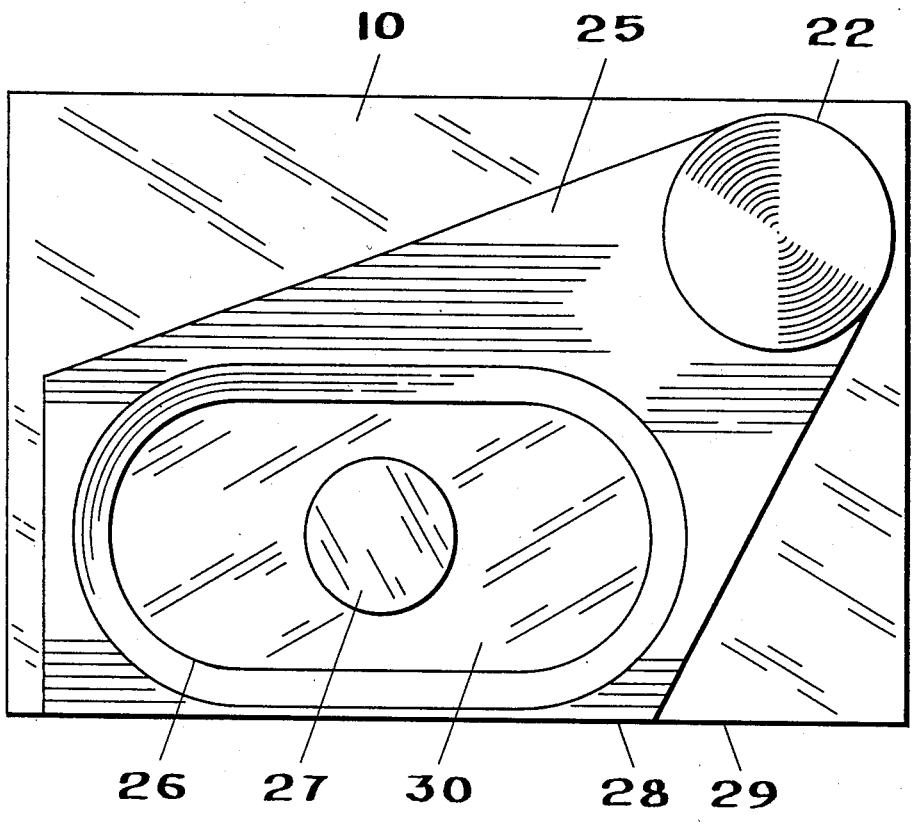
Figure 2:
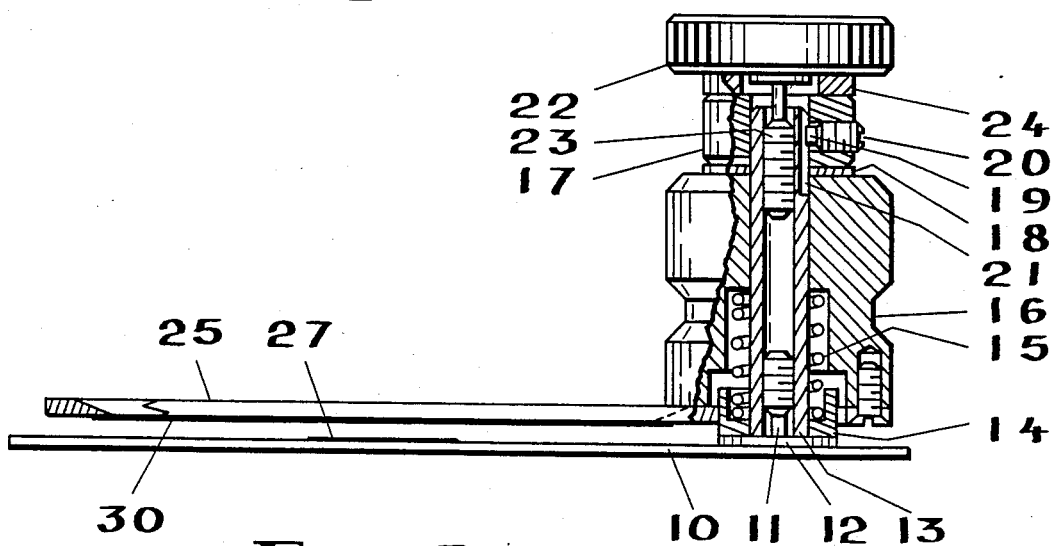

Referring to FIGS. 1 and 2, for which similar numbers identify similar items throughout the figures, the preferred arrangement is shown.

A standard 2 inch by 3 inch microscope slide serves as the base (10). Male, threaded stud (11) with flange (12) at its base is cemented to the top surface of base (10) near the rear righthand corner. Column (13) has a female, threaded portion at each end and is assembled onto the threaded stud (11). Spring seat (14) also serves as a protective shield against contamination of the moving parts and as a lower limit for the adjustment mechanism and is assembled onto column (13) at the flange (12). A helical compression spring (15) is assembled onto column (13) with its lower end in seat (14).

Hub (16) is assembled onto column (13) and resting on spring (15). Hub (16) is free to move up and down column (13) and to rotate upon it. Isolation element (17) is assembled onto column (13) separated from hub (16) by nylon washer (18). Isolation element (17) is free to move up and down on column (13), but is not free to rotate on it, being restrained by the cylindrical tip (19) of the set screw (20) which is threaded into the body of the isolation element (17). Tip (19) extends into keyway (21) located at the upper end of the column (13). The width of keyway (21) and the diameter of tip (19) are such as to provide a sliding fit with minimum clearance. Adjusting knob (22) with male, threaded portion (23) is assembled into the upper threaded portion of column (13), separated from isolation element (17) by a second nylon washer (24).

Turning the adjusting knob (22) so as to screw its thread into the column (13) causes pressure to bear, in turn, on nylon washer (24), isolation element (17), nylon washer (18), hub (16) resulting in compression of spring (15). Turning the adjusting knob (22) in the reverse direction permits the spring (15) to return the hub (16) upward. Isolation element (17) prevents rotational force from being applied to hub (16), and, conversely, prevents rotational force from being applied to the adjustment knob (22) when the hub (16) is turned.

Arm (25) is attached to the underside of hub (16) and extends over base (10) nearly to the left edge and has an elongated opening (26) the center of which is located directly over the center of stage disk (27) which is cemented to the upper surface of base (10). The location of the centers of the stage disk (27) and the opening (26) are selected with reference to the center of the adjusting mechanism above described so that juxtaposition of these centers is obtained when the front edge (28) of arm (25) is positioned over the front edge (29) of base (10). The diameter of the stage disk (27) is selected so that when the arm (25) is in the above described position, the entire area of the stage disk (27) may be scanned without any objective of the microscope coming inn contact with the beveled edges of the opening (26), and changes can be made from one objective to another when these are mounted on a revolving nosepiece in similar manner. Thin, rectangular, glass element (30) is cemented to the underside of arm (25) extending just beyond the edges of opening (26). The lower surface of element (30) is precisely parallel to the upper surface of stage disk (27), and by means of the above described adjusting mechanism these surfaces can be brought into contact with each other and separated to about ⅛ inch.

In use, the adjusting knob (22) is turned so as to raise the lower surface of element (30) clear of the upper surface of disk (27) and the arm (25) is moved aside sufficiently to uncover the disk (27). A dry specimen, or one in liquid, is placed on stage disk (27), arm (25) is returned to its working position with edges (28) and (29) aligned vertically and is then lowered until the lower surface of element (30) is in contact with the specimen and sufficient pressure has been applied to constrain movement. The microcompressor is then grasped by the hub (16) and placed on the stage of a microscope. If the specimen is in liquid, it can be rolled over for purposes of obtaining different viewing aspects by slight rotation of hub (16) whereby the arm (25) and element (30) will be displaced laterally. This can be done without disturbing the vertical setting.

The preferred arrangement described herein is chosen for its manufacturing economy. Those skilled in the art will realize that the desired thickness from the underside of the base to the upper surface of the stage disk might be obtained by mounting the stage disk in a thin, sturdy, metallic base. Furthermore, the desired isolation of rotational movements also might be obtained with splines, or with a column having a flat and a "D" washer, or with a column having two flats and a "Double D" washer, or a precision thrust ball bearing without departing from the spirit of my invention.

The preferred arrangement described above is not to be construed in a limiting sense. The claims appended hereto encompass all modification and changes as will fall within the scope and spirit of the present invention.

I claim:

1. A device for restricting movement of a microscopic, living organism during microscopic examination comprising;

adjustable means for varying the separation between two flat, parallel surfaces of a first glass element mounted on a base and a second glass element mounted on a movable arm extending from a hub assembled slidably and rotatably on a column mounted perpendicularly on said base;

a compression spring assembled concentrically on said column and supporting said hub;

an isolation element assembled slidably on and in non-rotatable engagement with said column;

an adjusting knob with threaded portion assembled onto or into said column and bearing on said isolation element, said knob providing adjusting means for raising and lowering said hub against the pressure of said spring, said isolation element preventing the transfer of rotational force in either direction between said knob and said hub;

wherein said first glass element is shaped and located with reference to the center line of said column and a clear area of said second glass element is shaped and located with reference to the first glass element so that the centers of said two glass elements can be brought into juxtaposition, in which setting the entire area of said first glass element can be scanned and, while viewing any point within the area of said first glass element, parfocal microscope objectives mounted on a revolving nosepiece can be interchanged without mechanical interference between said microscope objectives and said arm and said adjusting means.

* * * * *